United States Patent
Tom et al.

(10) Patent No.: US 7,305,470 B2
(45) Date of Patent: Dec. 4, 2007

(54) METHOD FOR DISPLAYING WEB USER'S AUTHENTICATION STATUS IN A DISTRIBUTED SINGLE LOGIN NETWORK

(75) Inventors: Allen Lee Tom, Mountain View, CA (US); Mohan Kumar S. Bethur, San Jose, CA (US); Hyun Jong Shin, Redwood City, CA (US); Jun-Shong Huang, San Jose, CA (US)

(73) Assignee: AOL LLC, Dulles, VA (US)

( * ) Notice: Subject to any disclaimer, the term of this patent is extended or adjusted under 35 U.S.C. 154(b) by 899 days.

(21) Appl. No.: 10/365,979

(22) Filed: Feb. 12, 2003

(65) Prior Publication Data

US 2004/0158574 A1 Aug. 12, 2004

(51) Int. Cl.
| | |
|---|---|
| *G06F 15/16* | (2006.01) |
| *G06F 7/04* | (2006.01) |
| *G06F 3/00* | (2006.01) |
| *H04K 1/00* | (2006.01) |
| *H04L 9/32* | (2006.01) |
| *G06F 15/173* | (2006.01) |
| *G06F 17/30* | (2006.01) |
| *G06F 3/048* | (2006.01) |
| *H04L 9/00* | (2006.01) |
| *G06Q 99/00* | (2006.01) |

(52) U.S. Cl. ............... 709/225; 709/218; 709/219; 709/229; 726/4; 726/8; 715/741; 715/744; 715/745; 715/772; 715/513; 715/779; 715/808; 705/67

(58) Field of Classification Search ............... 709/203, 709/217–219, 225, 227–229; 726/3–8; 719/315, 719/316; 715/513, 741–747, 760, 772, 779, 715/808–811; 705/67
See application file for complete search history.

(56) References Cited

U.S. PATENT DOCUMENTS

| | | | | |
|---|---|---|---|---|
| 5,778,377 | A | 7/1998 | Marlin et al. | ............... 707/103 |
| 5,963,925 | A | 10/1999 | Kolling et al. | ............... 705/40 |
| 5,970,477 | A | 10/1999 | Roden | ............... 705/32 |
| 5,974,572 | A | 10/1999 | Weinberg et al. | ............... 714/47 |
| 5,978,648 | A | 11/1999 | George et al. | ............... 434/362 |

(Continued)

FOREIGN PATENT DOCUMENTS

EP 774 725 5/1997

(Continued)

OTHER PUBLICATIONS

*Netegrity Siteminder:* Ask The Experts—SearchCIO.com—Ebusiness Security Experts(s): Puneet Mehta, Dec. 4, 2001.

(Continued)

*Primary Examiner*—Melvin H. Pollack
(74) *Attorney, Agent, or Firm*—Michael A. Glenn; Glenn Patent Group (57) ABSTRACT

The invention provides a system and method for automatically displaying a user's logged-in status across an Internet based network of affiliated Web sites via a visual indicator such as a toolbar to help the user to be certain about his logged-in status when he stays with one or switches from one to another affiliated Web site.

16 Claims, 6 Drawing Sheets

U.S. PATENT DOCUMENTS

| | | | |
|---|---|---|---|
| 5,987,611 A | 11/1999 | Freund | 713/201 |
| 5,999,179 A | 12/1999 | Kekic et al. | 345/349 |
| 6,073,119 A | 6/2000 | Bornemisza-Wahr et al. | 705/42 |
| 6,112,190 A | 8/2000 | Fletcher et al. | 705/38 |
| 6,115,040 A | 9/2000 | Bladow et al. | 345/335 |
| 6,192,405 B1 | 2/2001 | Bunnell | 709/225 |
| 6,272,537 B1 | 8/2001 | Kekic et al. | 709/223 |
| 6,341,316 B1 | 1/2002 | Kloba et al. | 709/248 |
| 6,385,494 B1 | 5/2002 | Blahnik et al. | 700/86 |
| 6,385,595 B1 | 5/2002 | Kolling et al. | 705/40 |
| 6,385,655 B1 | 5/2002 | Smith et al. | 709/232 |
| 6,397,378 B1 | 5/2002 | Grey et al. | 717/4 |
| 6,401,220 B1 | 6/2002 | Grey et al. | 714/33 |
| 6,421,717 B1 | 7/2002 | Kloba et al. | 709/219 |
| 6,434,607 B1 | 8/2002 | Haverstock et al. | 709/217 |
| 6,442,590 B1 | 8/2002 | Inala et al. | 709/204 |
| 6,460,058 B2 | 10/2002 | Koppolu et al. | 707/501.1 |
| 6,668,322 B1* | 12/2003 | Wood et al. | 713/182 |
| 6,701,438 B1* | 3/2004 | Prabandham et al. | 726/11 |
| 6,763,468 B2* | 7/2004 | Gupta et al. | 726/2 |
| 6,826,696 B1* | 11/2004 | Chawla et al. | 726/4 |
| 6,859,878 B1* | 2/2005 | Kerr et al. | 713/183 |
| 6,892,307 B1* | 5/2005 | Wood et al. | 726/8 |
| 6,941,376 B2* | 9/2005 | Mitchell et al. | 709/229 |
| 6,970,904 B1* | 11/2005 | Rode | 709/203 |
| 7,010,582 B1* | 3/2006 | Cheng et al. | 709/219 |
| 7,016,875 B1* | 3/2006 | Steele et al. | 705/44 |
| 7,032,241 B1* | 4/2006 | Venkatachary et al. | 726/4 |
| 7,069,293 B2* | 6/2006 | Cox et al. | 709/203 |
| 7,093,020 B1* | 8/2006 | McCarty et al. | 709/229 |
| 7,150,038 B1* | 12/2006 | Samar | 726/8 |
| 7,188,360 B2* | 3/2007 | Gerdes et al. | 726/4 |
| 7,191,467 B1* | 3/2007 | Dujari et al. | 726/5 |
| 7,225,464 B2* | 5/2007 | Satyavolu et al. | 726/10 |
| 2003/0014519 A1* | 1/2003 | Bowers et al. | 709/225 |
| 2003/0140120 A1* | 7/2003 | Hartman | 709/219 |
| 2004/0158746 A1* | 8/2004 | Hu et al. | 713/202 |
| 2005/0022006 A1* | 1/2005 | Bass et al. | 713/201 |
| 2005/0144452 A1* | 6/2005 | Lynch et al. | 713/170 |
| 2006/0107217 A1* | 5/2006 | Lu et al. | 715/733 |

FOREIGN PATENT DOCUMENTS

| | | |
|---|---|---|
| EP | 907 120 | 4/1999 |
| EP | 1 168 203 | 1/2002 |
| EP | 1 168 204 | 1/2002 |
| EP | 1 168 765 | 1/2002 |
| EP | 1 227 635 | 7/2002 |

OTHER PUBLICATIONS

*5.8: Single Sign-On*: Single Sign-On: WebSphere Application Server—InfoCenter Home>5: Securing applications—special topics > 5.8: Single Sign-On, Feb 10, 2003.

*Universal Wed Agent Datasheet*: Home>Products>Authentication and Access Control>SafeWord™ PremierAccess™>Applications Protected by PremierAccess>Universal Web Agent, Feb. 2002.

*Not Another ID and Password: A Look at Single Sign-On*: M. Bonham II, Feb 10, 2003.

*Challenge 2: Cross Domain Authentication (Web SSO)*; OneName Corporation; Home>Products & Solutions>7 digital Identity Challenges>Challenge 2, Feb. 10, 2003.

*Securant Debuts Single Sign-On Across Multiple Sites*: G. Hulme; InformationWeek Online; May 2000.

*Extended SSO*; Integrating Siebel 2000 (6.X) and Siebel 7 Into Your SSO Environment —p. 4; Netegrity Portal Security Software, Feb. 10, 2003.

*Numerical Relativity in a Distributed Environment*; W. Benger I. Foster J. Novotny, E. Seidel, J. Shalf, W. Smith, P. Walker, Apr. 1999.

*Issues in the Security Architecture of the Computerized Patient Record Enterprise*; K. Beznosov; Apr. 1998.

Entrust TruePass™; Entrust: Entrust TruePass—Frequently Asked Questions, Feb. 10, 2003.

*Securing Access to BEA WebLogic® Applications Using SafeWord™ PremierAccess™*; Home>Products Authentication and Access Control>SafeWord™ PremierAccess™>Applications Protected by PremierAccess>Application interoperability papers>BEA WebLogic® Feb. 10. 2003.

*Providing Multi-Layer Security Support for Wireless Communications Across Multiple Trusted Domains*; J. Kong, M. Gerla, B.S. Prabhu, R. Gadh; UCLA Computer Science Department Technical Report 020032, Sep. 2002.

*Authentication in Distributed Systems: Theory and Practice*; B. Lampson, M. Abadi, M. Burrows, E. Wobber; Digital Equipment Corporation, Nov. 1992.

*Preserving State on the World Wide Web Using Dynamic Argument Embedding*; A. Iyengar, IBM Research Division; T.J. Watson Research Center, Mar.-Apr. 1997.

*Using Netscape Directory Server to Manage NT Domains*; G. Yost; NT Insights, 1999.

*Role-Based Security for Distributed Object Systems*; N. Yialelis, E. Lupu, M. Sloman; Department of Computing, Imperial College, Jun. 19-21, 1996.

\* cited by examiner

METHOD FOR DISPLAYING WEB USER'S AUTHENTICATION STATUS IN A DISTRIBUTED SINGLE LOGIN NETWORK

BACKGROUND OF THE INVENTION

1. Technical Field

This invention relates generally to cross domain authentication technology. More particularly, the invention relates to a method and system for automatically displaying a Web user's authentication status across an Internet based network of participating Web sites.

2. Description of the Prior Art

To request a service or conduct other electronic transactions in an Internet based network, a user is usually required to go through an authentication process. In other words, the user is required to provide the seller or service provider with some credential information, such as his personal identification, contact information, or even financial information. The authentication process may take from several seconds to several minutes. Because each seller or service provider usually maintains its own authentication server and database, millions of sellers and service providers might share thousands or millions of consumers or users. Some of the consumers or users might be required to go through the same or substantially similar authentication process again and again if they have transactions with many sellers or service providers. This repetitive authentication not only wastes the consumers' time, but also burdens the sellers or service providers because they have to expand their databases to keep detailed authentication information for a growing number of users. This situation brings forth a technical need to create a universal, unified, single-login infrastructure wherein a specific user may be authenticated once for all and the authentication result is widely recognized by a large number of sellers or service providers.

In responding to that need, several approaches have been developed. For example, Microsoft Corporation has introduced a ".NET Passport" single sign-in system. With ".NET Passport," a user does not need to register a member name and password at each affiliated site he visits. The user may simply use his e-mail address and password that registered as his ".NET Passport" to sign in to any participating site of the network. The information the user registers with ".NET Passport" is stored online, securely, in the ".NET Passport" database as the user's ".NET Passport profile." When the user signs in to a ".NET Passport" participating site by typing his e-mail address and password in the ".NET Passport" sign-in box, ".NET Passport" confirms that (1) the e-mail address he entered is registered with ".NET Passport", and (2) the password he entered is correct. ".NET Passport" then notifies the site that the user has provided valid "sign-in credentials," and thus he is given access to the participating site. Once the user signs in to one ".NET Passport" participating site during an Internet session, he can sign in to any other site simply by clicking the ".NET Passport" sign-in button available at the site.

Another example is America Online Incorporated (AOL)'s "Screen Name Service" system, which provides a free service allowing anyone with a "Screen Name" to register easily and securely at a variety of Web sites. The "Screen Name Service" eliminates a user's need to remember multiple names and passwords for all the places he visits on the Web. With the "Screen Name Service" system, each user has a "My Profile", which stores the user's personal credentials used to make registration at sites across the Web simple and secure. When the user registers at a participating site using the service, he has the opportunity to choose which fields of information stored by AOL, if any, he would like to share with that site. No information is shared with any site without the user's explicit permission. When the user agrees to share certain information with a participating site, that information is conveyed to the site at which he is registering. Another feature is that the user is provided with a "My Site List", which is an effective way to manage personal information because it shows the user with which sites he has registered using the service. The user can view the privacy policy of a site to see how it uses information it knows about the user. The user can also decide if he would like to be signed into the site without being prompted and if the site should be updated with information when "My Profile" changes.

In these distributed single login networks, cross domain status toolbars or indicators are static and do not display a personalized greeting across multiple domains. For example, when the user with a screen name "ljewpt9" logs in the MSN e-mail service, his full e-mail address ljewpt9@hotmail.com is displayed in the upper-left corner of every mail service pages such as the "inbox," "sent," "trash," etc. When the user switches to other pages hosted by MSN, such as "search," "music," "sports," neither the user's e-mail address, nor his screen name, nor his first name or last name associated with his account is displayed. There is only a small bar "sign Out.net" embedding in the pages. Without a close look, the user is not certain whether he is still logged-in or who is currently logged-in on the page. Similarly, when the user switches from an MSN page to any other affiliated website with ".NET Passport", the user's logged-in status or personalized greeting is not expressly displayed in the targeted pages.

Websites, such as yahoo.com and amazon.com, display personalized greetings on their sites, but only on pages under the same domain from which they originally authenticated. For example, a user, with a screen name "ljewpt9", who is authenticated to yahoo.com can only be identified on Web pages hosted on yahoo.com. When the user logs in the yahoo e-mail service, his full e-mail address ljewpt9@yahoo.com is displayed in the upper-right corner of every mail service pages such as the pages for "inbox", "draft", "sent", "trash", and "bulk", etc. When the user switches to "Yahoo! Travel" or "Weather", a greeting like "Welcome, Ljewpt9" is displayed on the page. However, the user's login status cannot be displayed on any other Web pages which are not hosted by yahoo.com.

What is desired is a mechanism to automatically display a user's logged-in status across an Internet based network of affiliated Web sites so that the user is certain about his logged-in status when he stays with one or switches from one to another affiliated Web site.

SUMMARY OF THE INVENTION

The invention provides a system and method for automatically displaying a user's logged-in status across an Internet based network of affiliated Web sites via a visual indicator such as a toolbar to help the user to be certain about his logged-in status when he stays with one or switches from one to another affiliated Web site. The visual indicator has two modes: logged-in and logged-out. In the logged-in mode, the indicator displays the user's login name, such as a screen name or a personalized greeting, and a virtual button, by clicking which the user signs out. In the logged-out mode, the indicator displays a virtual button for signing in. When the user has signed in one participating site of the network, the user is automatically recognized at all other sites which use the visual indicator.

The visual indicator is hosted on a single Web site. Once the user has been authenticated to the indicator Web site, the user is recognized at all affiliated Web sites that embed the indicator. A Web site embeds the indicator by instructing the user's Web browser to load additional JavaScript from the indicator Web site. The additional JavaScript writes the indicator HTML onto the Web page that the user visits.

The invention allows a participating Web site to recognize a user who has never visited the site before and customize its content based on the user. The invention can also be used to track users across multiple Web sites to determine their interests and to display customized content and promotions targeted to the user.

BRIEF DESCRIPTION OF THE DRAWINGS

FIG. 5a is an exemplary page where the status indicator is in logged-in mode showing the user is validly logged in;

DETAILED DESCRIPTION OF THE INVENTION

Figure 1:
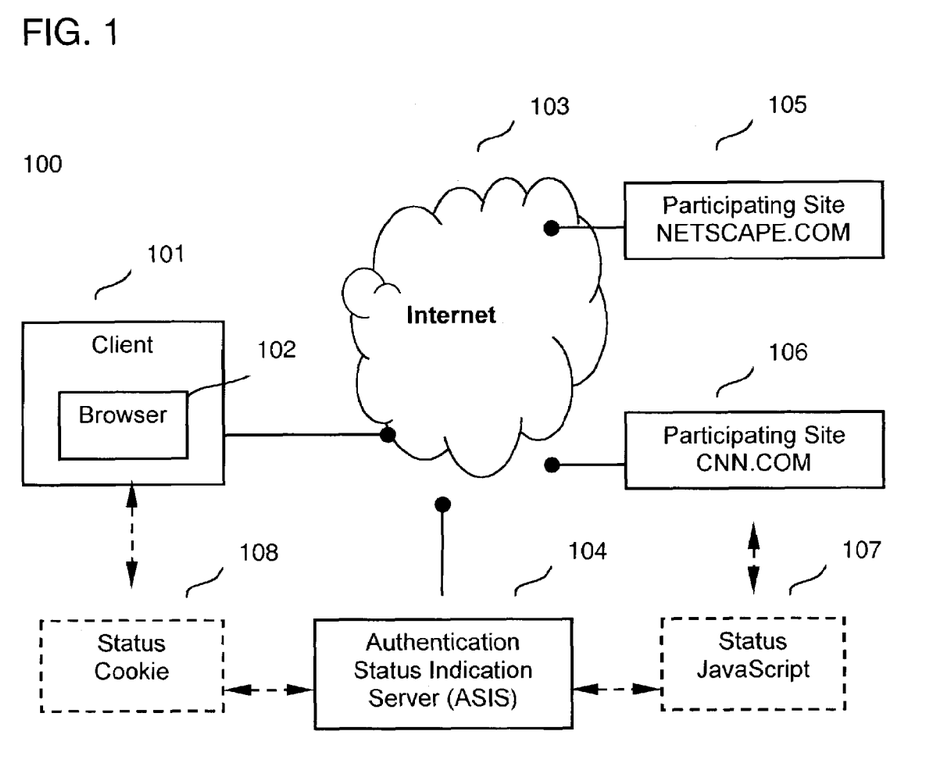
FIG. 1 is a schematic block diagram illustrating a distributed, single login network according to the invention.

FIG. 1 is schematic block diagram illustrating a distributed, single login network 100 which comprises at least one client 101 with a Web browser 102, an authentication status indication server (ASIS) 104, a plurality of participating websites such as NETSCAPE.COM 105 and CNN.COM 106, communicatively coupled to the Internet 103. The ASIS 104 centrally hosts the authentication status indicator in all affiliated sites. The authentication status indicator, which displays the user's authentication status information, may be incorporated in a dashboard or a toolbar or any other visual cue on the Web pages. The status information may include the user's login name, such as his screen name or his e-mail address or even his full name, and/or a short welcome message or other information. The content of the visual indicator, i.e. the user's status information is centrally served, managed, and tracked.

The participating sites embedding the status indicator do not need to run any additional software or Web server plug-ins to display the indicator. However, they must include a few lines of HTML and a small piece of JavaScript code, called bootstrapping code, in their page headers. The function of the bootstrapping code is to instruct the user's Web browser 102 to load additional JavaScript 107 from the ASIS 104 to render each participating website's status indicator in logged-in mode or logged-out mode.

All content updates are managed from one single site, i.e. the ASIS 104. The participating sites which deploy the bootstrapping code automatically get future revisions on the dashboard without any additional work.

An exemplary of the bootstrapping code is given below:

```
<table border="O" cellpadding="O" cellspacing="O" width="WWW">
  <tr><td>
    <script Language="Javascript" SRC= "http://tool
bar.aol.com/dashboard.twhat?dom=XXX">
    </script>
  </td></tr>
</table>
```

Here, WWW should be the desired width in pixels of the Dashboard and XXX should be the site's three digit partner code.

The user's authentication status information is stored in an authentication status cookie 108 which is sent to the ASIS 104 when the user is logged into the network 100. The ASIS 104 checks the validity of the received cookie and returns JavaScript 107 to render the toolbar in logged-in mode if the cookie is valid, or logged-out mode if the cookie is missing or invalid.

Because the authentication status cookie 108 is stored on one central server (ASIS 104), the cookie 108 can be shared across multiple participating sites if each site embeds the bootstrapping code on their Web pages. The cookie is bound to the ASIS 104, not to the top level domains such as .NETSCAPE.COM or .AOL.COM. Since the cookie 108 should only be read by the ASIS 104, it should be acceptable to keep the cookie in clear text. This eliminates the computational overhead of decrypting the cookie for each page view. Alternatively, the ASIS 104 may use other authentication methods without using a local status cookie.

To prevent unauthorized sites from reading the user's sensitive personal data, the ASIS 104 never returns the user's screen name in the indicator JavaScript or in text form. Instead, an image containing the screen name is used and the browser 102 is instructed to display the image. This mechanism prevents unauthorized sites from reading or extracting the screen name or other personal information from users who visit them.

Alternatively, each website could maintain their own authentication scheme, using cookies or some other method. A website would have no way of determining if the user has logged into any other participating website. A system could be devised where a participating website would redirect the user's browser to a third party site which would then somehow pass the authentication credentials back to the originating site, if the user is logged in. However, the originating site would have to redirect all users to this third party site, without knowing ahead of time if the user is logged in. Redirecting the user to another site to check the authentication status is very complicated (special software and protocols must be installed and agreed upon between the originating site and the third party site) and also adds a great deal of time needed to display the content on the originating site.

Note that the authentication status indication server (ASIS) 104 is built on top of a single login service (cross sites authentication) such as AOL's Screen Name Service (SNS). Without ASIS 104, the participating sites of the single login service such as SNS would not be able to automatically recognize users who are signed into a different domain via SNS. To recognize a user who is already signed into a first site via SNS, a second site would require the user to click on a login button. There was no way to recognize the user automatically without the user's intervention. However, this invention allows users to be recognized and authenticated across multiple domains. Once a user has been authenticated to one participating site that embeds the status indicator, the toolbar for example, the user is recognized at all other participating sites that embed the indicator.

Figure 2:
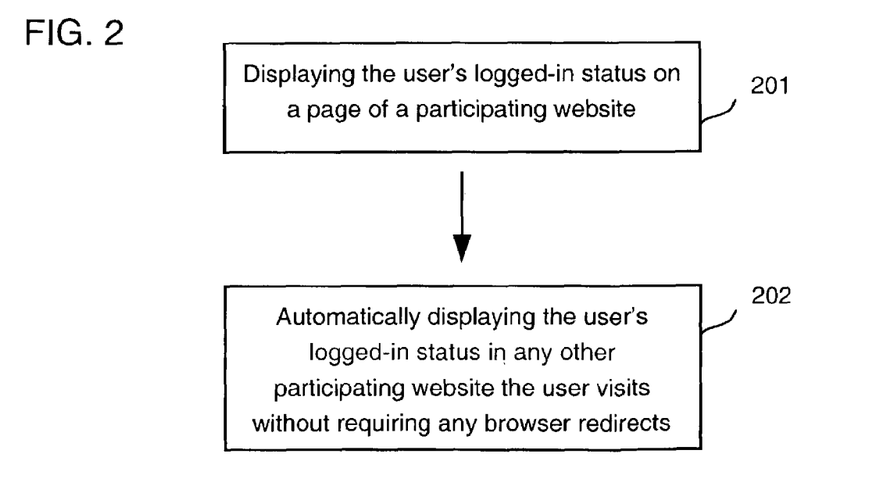
FIG. 2 is a schematic flow diagram illustrating a method for automatically displaying a Web user's authentication status in a distributed single login network according to the invention.

FIG. 2 is a schematic flow diagram illustrating a method for automatically displaying a Web user's authentication status in a distributed single login network according to the invention. The method comprises the steps of:

Step 201: Displaying the user's logged-in status on the page of a participating website from which the user logged in the network 100; and Step 202: When the user switches from one participating website to another participating website with a different domain, automatically displaying the user's logged-in status in said another participating website without requiring any browser redirects or any additional Web application. No client software such as browser plug-in or special client application is required to be installed on the user's computer, nor is any special Web application or server software required to be installed on the participating site's servers.

Figure 3A:
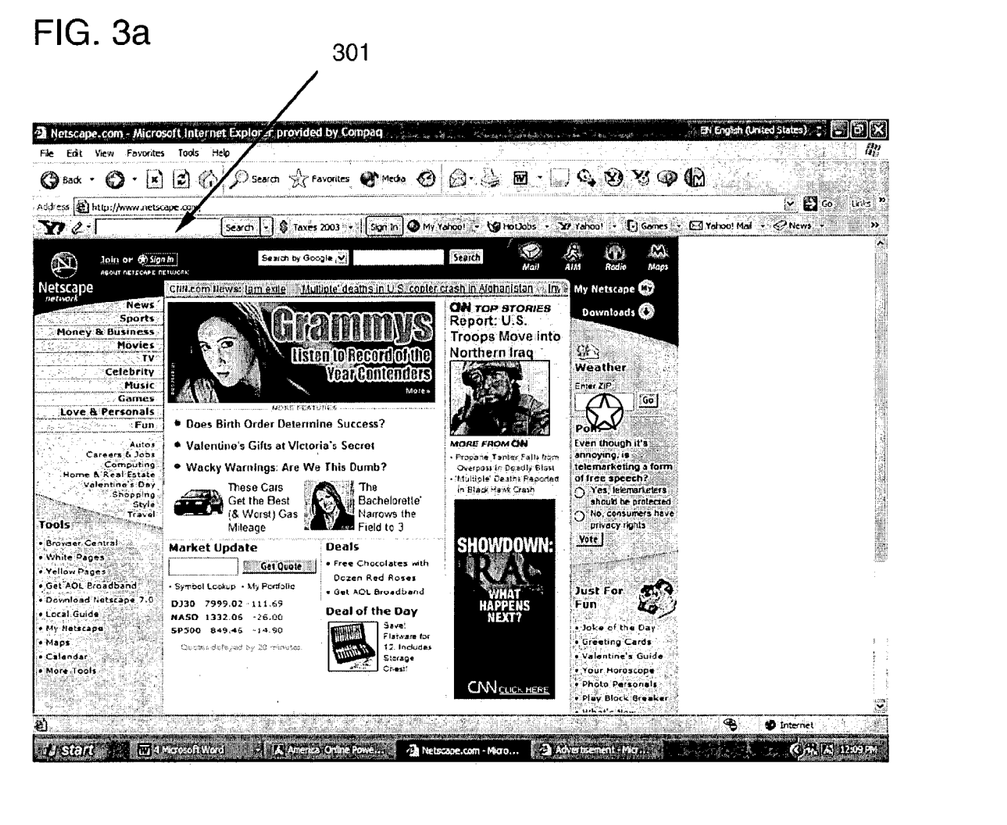
FIG. 3a is an exemplary page where an authentication status indicator is in its logged-out mode.

FIG. 3a is an exemplary page of NETSCAPE.COM where an authentication status toolbar 301 is in its logged-out mode. The toolbar may be in any color or any shape, and may be placed anywhere in the page.

Figure 3B:
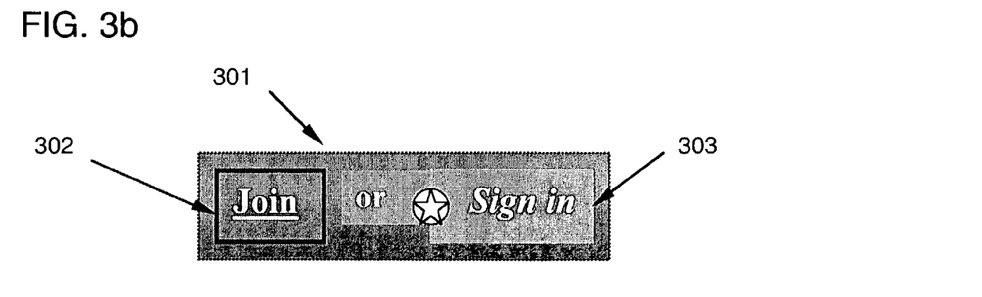
FIG. 3b is a schematic diagram showing a typical graphical arrangement of the status indicator in logged-out mode.

FIG. 3b illustrates a typical graphical arrangement of the toolbar 301 in logged-out mode. By clicking the "Join" button 302, a user is prompted to a registration page for joining as a member. Similarly, by clicking the "Sign in" button 303, the user will be prompted to a "sign in" page for authentication.

Figure 4:
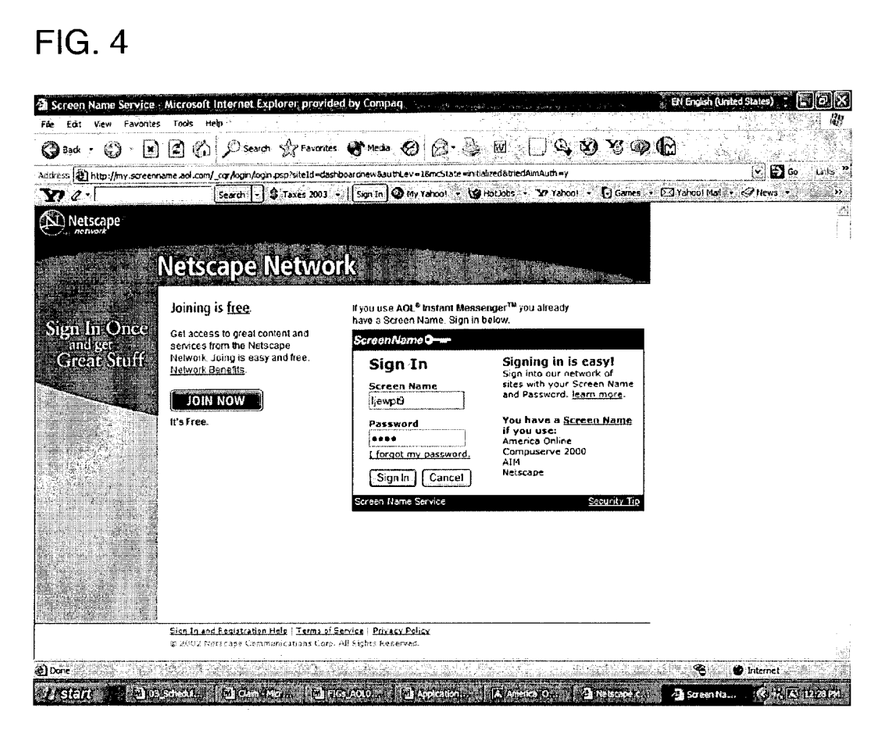
FIG. 4 is an exemplary "sign in" page where the user enters his login name and his password for authentication.

FIG. 4 is an exemplary "sign in" page 401 of NETSCAPE.COM where the user enters his screen name "Ljewpt9" and his password "★★★★" for authentication.

Figure 5A:
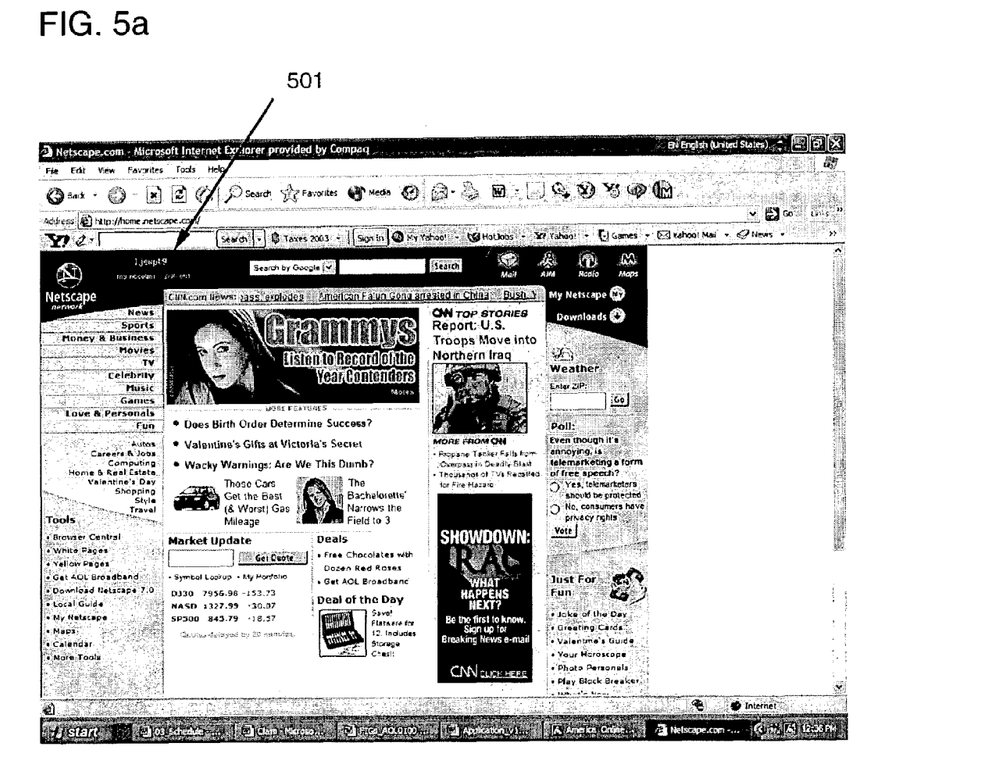

FIG. 5a is an exemplary page of NETSCAPE.COM where the authentication status toolbar is in logged-in mode 501. The toolbar may be in any color or any shape, and may be placed anywhere in the page.

Figure 5B:
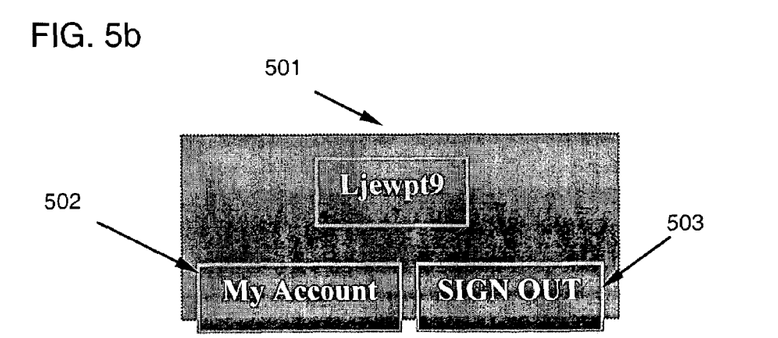
FIG. 5b is a schematic diagram showing a typical graphical arrangement of the status indicator in its logged-in mode.

FIG. 5b illustrates a typical graphical arrangement of the status toolbar in its logged-in mode 501 which comprises the user's screen name, a "My Account" button 502, which links to an account information page, and a "Sign out" button 502, by clicking which the user signs out.

Figure 6A:
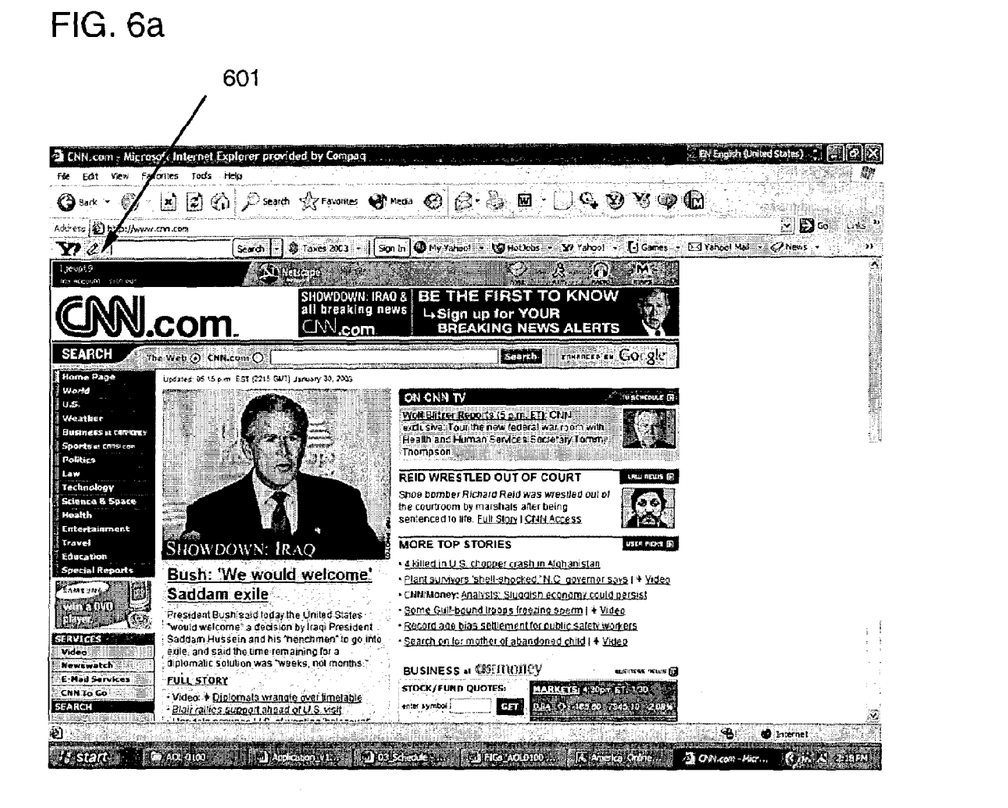
FIG. 6a is an exemplary page of a participating site where the user's logged-in status is automatically displayed in the status indicator when the user switches to this site.

FIG. 6a is a sample page of CNN.COM, a participating site where the user now visits. The user's logged-in status is automatically displayed in the status toolbar which is also in logged-in mode 601.

Figure 6B:
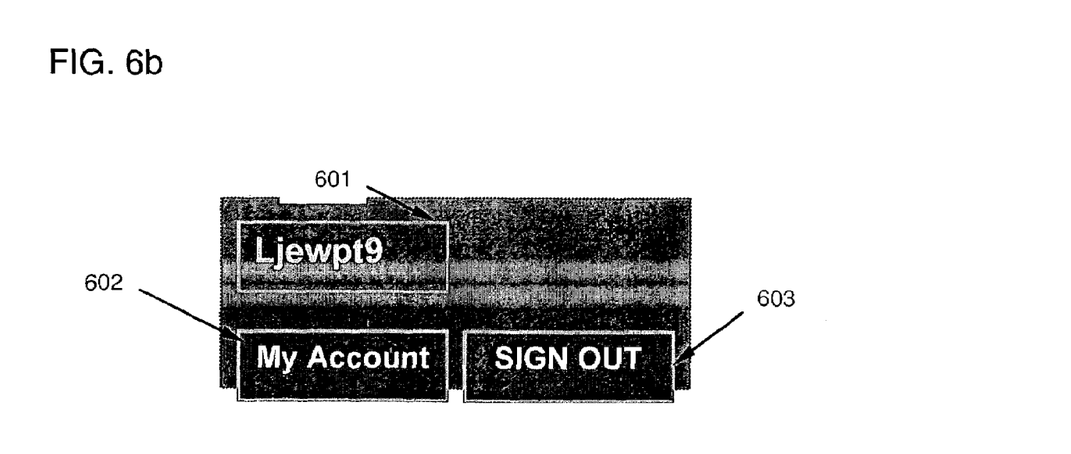
FIG. 6b is an exemplary schematic diagram of the status indicator in logged-in mode with a slightly different appearance.

FIG. 6b illustrates the status toolbar in its logged-in mode 601 which is slightly different in size and font from the status toolbar as illustrated in FIG. 5b. The status toolbar in logged-in mode comprises the user's screen name, a "My Account" button 602, which links to an account information page, and a "sign out" button 602, by clicking which the user signs out.

Note that once the user logs in any participating site, the logged-in status is recognized at any other participating site simultaneously without need to redirect the user's logged-in status from a central server back to the user's Web browser.

Figure 7:
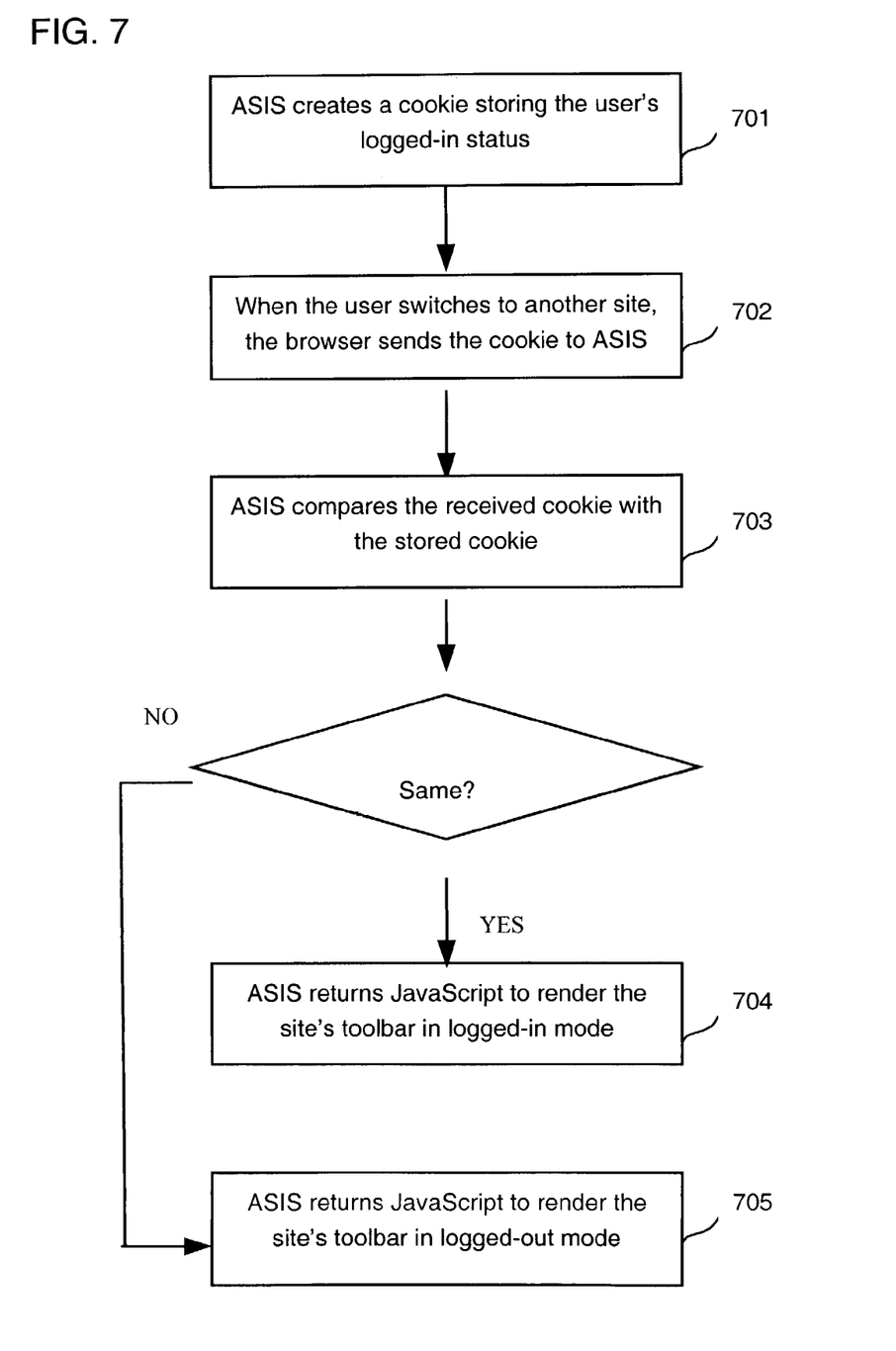
FIG. 7 is a flow diagram illustrating a method for automatically displaying a Web user's authentication status in a distributed single login network using an authentication status cookie according to the invention.

FIG. 7 is a flow diagram illustrating a method for automatically displaying a Web user's authentication status in a distributed single login network using a status cookie according to the invention. The method comprises the steps of:

Step 701: Whenever the user logs in the network 100, the authentication status indication server (ASIS) 104 returns JavaScript to have the user's Web browser load the status toolbar in logged-in mode and at the same time creates a cookie 108 storing the user's logged-in status and sends the status cookie to the user's Web browser 102;

Step 702: Whenever the user switches from one participating website to any other participating website in a different domain, the user's Web browser 102 sends the cookie 108 to the ASIS 104;

Step 703: The ASIS 104 compares the received cookie with the stored cookie 108;

Step 704: If the received cookie is identical with the stored cookie 108, the ASIS 104 returns JavaScript 107 to render said any other participating website's toolbar in logged-in mode (see FIG. 6a and FIG. 6b, 601); and Step 705: If no cookie is received or the received cookie is not identical with the stored cookie 108, the ASIS 104 returns JavaScript 107 to render said any other participating website's toolbar in logged-out mode.

The method described above allows a participating Web site to recognize a user who has never visited the site before and customize its content based on the user. It also allows the users to personalize their UIs and look and feel of multiple Web sites. In addition, the method can also be used to track users across multiple Web sites to determine their interests and to display customized content and promotions targeted to the user.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. A method for automatically displaying a Web user's authentication status in a distributed single login network, comprising the steps of:
    displaying said user's logged-in status on a first visual indicator in a participating website from which said user has logged in said network; and
    when said user switches from any participating website to any other participating website in a different domain, automatically displaying said user's logged-in status on another visual indicator in said any other participating website without requiring any browser redirects or any additional pre-installed application;
    wherein a visual indicator comprises an image which contains said user's Personal identification information, wherein any of said participating websites cannot extract the content of said image.

2. The method of claim 1, wherein said first visual indicator and said another visual indicator are substantially same.

3. The method of claim 1, wherein any of said visual indicators has only two states:
    logged-in; and
    logged-out.

4. A method for automatically displaying a Web user's authentication status in a distributed single login network, comprising the steps of:
- displaying said user's logged-in status on a first toolbar in a participating website from which said user has logged in said network; and
- whenever said user switches from any participating website to any other participating website in a different domain, automatically displaying said user's logged-in status on another toolbar in said any other participating website without requiring any browser redirects or any additional pre-installed application;
- wherein each participating website of said network embeds a small piece of JavaScript bootstrapping code which instructs said user's Web browser to load additional JavaScript from a central server of said network to render said each participating website's toolbar in logged-in state or logged-out state.

5. The method of claim 4, wherein whenever said user logs in said network, said central server creates a status cookie storing said user's logged-in status and sends said status cookie to said user's Web browser;
- wherein whenever said user switches from said any participating website to said any other participating website in a different domain, said user's Web browser sends said status cookie to said central server; and
- wherein said central server returns JavaScript to render said any other participating website's toolbar in logged-in state if the cookie received is identical with said status cookie, or in logged-out state if no cookie is received or the cookie received is not identical with said status cookie.

6. The method of claim 4, wherein said first toolbar and said another toolbar are substantially same.

7. In a distributed single login network which comprises at least one client, a plurality of participating websites and a central status indication server supporting a visual indicator embedded in each participating website, a method for automatically displaying a Web user's authentication status, comprising steps of:
- said status indication server creating a status cookie storing said user's authentication status information when said user logs in said network;
- sending said status cookie to said user's Web browser;
- said user's Web browser storing said status cookie loading said visual indicator in logged-in state;
- when said user switches to any other participating website, said user's Web browser sending said status cookie to said status indication server;
- said status indication server checking whether said status cookie is received and whether the received cookie is valid;
- if a valid status cookie is received, returning a first code to said user's Web browser, said first code rendering said visual indicator in said any other participating website in logged-in state; and
- if said status cookie is missing or if the received cookie is invalid, returning a second code to said user's Web browser, said second code rendering said visual indicator in said any other participating website in logged-out state;
- wherein each participating website embeds a third code which instructs said user's Web browser to load said first code or said second code from said status indication server.

8. The method of claim 7, wherein said steps are performed in said order recited.

9. The method of claim 7, wherein any of said codes is JavaScript.

10. The method of claim 7, wherein said first code instructs said user's Web browser to load an image which contains said user's personal identification information, wherein any of said participating websites cannot extract the content of said image.

11. The method of claim 7, wherein said visual indicator has only two states:
- logged-in; and
- logged-out.

12. The method of claim 7, wherein said visual indicator may vary in appearance in different participating sites.

13. A distributed single login network comprising:
- a plurality of participating websites with different domain names,
- a central status indication server which supports a visual indicator in each of said participating websites, the central server hosting the process that displays visual indicators of the user's status from site to site; and
- at least one client from which a user logs in said network;
- wherein each of said participating websites embeds a first JavaScript which instructs said user's Web browser to load from said status indication server a second JavaScript for rendering said visual indicator in logged-in state or a third JavaScript for rendering said visual indicator in logged-out state.

14. The network of claim 13, wherein when said user logs in said network, said status indication server creates a status cookie which stores said user's authentication status information and sends said status cookie to said user's Web browser;
- wherein whenever said user switches from one to another of said participating websites, said user's Web browser sends said status cookie to said status indication server;
- wherein if the cookie received is identical with said status cookie, said status indication server returns to said user's Web browser said second JavaScript for rendering said visual indicator in logged-in state; and
- wherein if the cookie received is not identical with said status cookie, said status indication server returns to said user's Web browser said third JavaScript for rendering said visual indicator in logged-out state.

15. The network of claim 13, wherein when said visual indicator is in logged-in state, said visual indicator displays:
- said user's login name or real name; and
- a first virtual button, by clicking which said user logs out said network.

16. The network of claim 13, wherein when said visual indicator is in logged-out state, said visual indicator displays:
- a second virtual button, by clicking which said users is prompted to a login page; and
- a third virtual button, by clicking which said user is prompt to a registration page.

* * * * *